United States Patent Office 3,356,010
Patented Dec. 5, 1967

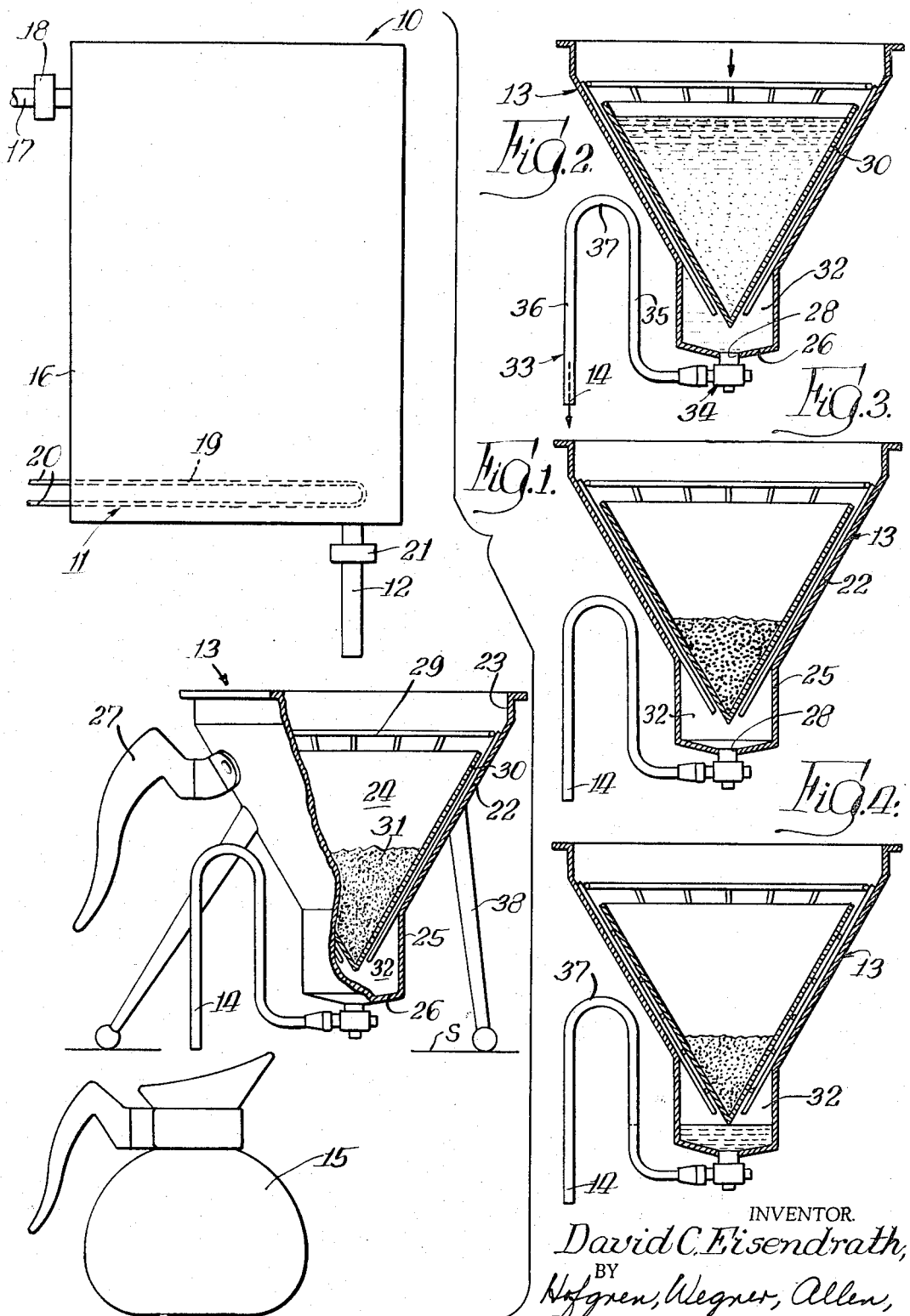

3,356,010
BEVERAGE BREWER
David C. Eisendrath, Chicago, Ill., assignor to Cory Corporation, a corporation of Delaware
Filed Oct. 21, 1965, Ser. No. 499,305
10 Claims. (Cl. 99—283)

ABSTRACT OF THE DISCLOSURE

A beverage brewer including a siphon connected to the bottom outlet of the brewing chamber which extends upwardly to intermediate the top of the chamber and the bottom outlet. Means are provided for delivering hot water into the chamber at the top thereof and for holding a brewing ingredient in the chamber spaced above the bottom outlet.

---

This invention relates to beverage brewers and in particular to beverage brewers of the type wherein a quantity of hot water is passed through a brewing cartridge carrying a suitable charge of brewing ingredients.

In one conventional form of beverage brewer adapted for the brewing of coffee and the like, means are provided for heating a quantity of hot water and delivering the quantity through a cartridge containing ground coffee whereby the hot water as it passes through the coffee grounds and downwardly from the brewing cartridge produces a coffee infusion. The brewed beverage is delivered from the brewing cartridge to a suitable container such as a cup or decanter. In such beverage brewers, it is desirable to prewet the coffee grounds to initiate the brewing action more efficiently. This is conventionally accomplished by providing a hot water delivery means which provides firstly a wetting quantity of hot water to the cartridge and after a period of time a second brewing quantity of hot water to complete the brewing operation. Such two-step hot water supply means are relatively costly as a result of the inclusion of the control circuitry necessary to provide the multiple delivery. Another problem found in the conventional beverage brewers of this type is the problem of preventing subsequent drip after completion of the brewing operation. Thus, while substantially all of the hot water is delivered from the brewing cartridge in the form of brewed beverage upon completion of the brewing operation, a quantity thereof remains in the charge and slowly drips therefrom. Such dripping is highly undesirable and presents a particularly vexatious problem with such brewing devices.

Still another disadvantage of the conventional beverage brewers of this type is the lack of ability of the brewer to provide other than the drip type brewing operation wherein the hot water is flowed through the cartridge. It has been found that a highly desirable method of brewing coffee and the like is one wherein at least a portion of the brewing time is one wherein the coffee grounds are submerged in the hot water, rather than merely wetted by the hot water.

The present invention comprehends an improved beverage brewer which eliminates the above discussed disadvantages of the known beverage brewers of this type in a novel and simple manner.

Thus, a principal object of the present invention is the provision of a new and improved beverage brewer.

A further object of the invention is the provision of such a beverage brewer having new and improved means for providing both a submersion type brewing action and a drip type brewing action during the brewing operation.

A further object of the invention is the provision of such a brewing apparatus having new and improved means for preventing undesirable drip from the apparatus subsequent to the completion of a brewing operation.

Still another object of the invention is the provision of such a brewing apparatus having new and improved means for retaining in the brewing chamber substantially all of the initial portion of the hot water delivered thereto until the level of water in the brewing chamber reaches a preselected level.

A still further object of the invention is the provision of such a brewing apparatus wherein the retaining means is arranged to permit the subsequent delivery of substantially all of the brewed beverage from the brewing chamber.

Another object of the invention is the provision of such a brewing apparatus including means defining a brewing chamber having an upper inlet for receiving hot water from the providing means, and a lower outlet for delivering brewed beverage from the chamber, means for carrying a brewing charge in the chamber to be acted upon by the hot water therein to produce a beverage, means for delivering brewed beverage from the chamber through the outlet including means for retaining the hot water in the brewing chamber until the level thereof rises to a preselected level whereby at least a portion of the charge is submerged and then permits delivery of substantially all of the brewed beverage from the chamber through the outlet, thereby permitting the initial portion of the hot water provided to the chamber to effect a submersion type brewing of the beverage and the subsequent portion of the preselected quantity of hot water to effect a drip type brewing of the beverage.

A further object of the invention is the provision of such a brewing apparatus wherein the delivering means includes a gooseneck siphon connected to the outlet and extending upwardly to the preselected level.

A yet further object of the invention is the provision of such a brewing apparatus wherein the retaining means includes a well portion at the bottom of the brewing chamber, with the outlet being provided in the bottom of the well portion.

Other objects and advantages of the invention will be apparent from the following description taken in connection with the accompanying drawing wherein:

FIGURE 1 is a side elevation of a brewing apparatus embodying the invention, with portions of the brewing cartridge broken away to facilitate illustration thereof;

FIGURE 2 is a vertical diametric section of the brewing and delivery means as during a brewing operation;

FIGURE 3 is a vertical section similar to that of FIGURE 2, but with the cartridge as arranged upon completion of the brewing operation; and FIGURE 4 is a vertical section similar to that of FIGURE 2, but with the cartridge as arranged upon completion of a subsequent drip collecting cycle of operation of the apparatus.

In the exemplary embodiment of the invention as disclosed in the drawing, a brewing apparatus generally designated 10 is shown to comprise a hot water supply apparatus 11 having an outlet 12, and a beverage brewing cartridge 13 disposed below the hot water supply outlet 12 for receiving hot water therefrom for brewing a beverage such as coffee and delivering the brewed beverage through an outlet 14 to a suitable receiver such as a decanter 15. The hot water supply means 11 may be of any conventional construction suitable for providing a preselected quantity of hot water. The hot water supply means may be automatic or manually operated, as desired, as will be obvious to those skilled in the art. Illustratively, the hot water heater 11 may comprise a tank 16 having a cold water inlet 17 suitably controlled as by a valve 18, an electrical heater 19 and having suitable external terminals 20 for connection to a suitable power supply, and a suitable valve 21 for controlling the outlet 12. Valve 21 may be automatically operated to be opened for a preselected period of time to deliver a preset quantity of water to the cartridge, or may be manually operated to provide a preselected quantity of hot water to the cartridge under the direct control of the user. In the illustrative embodiment, the quantity of water is illustratively the normal volume of the decanter 15 so that one brewing operation will produce one decanter full of brewed coffee.

The brewing cartridge 13 comprises a frusto-conical outer wall member 22 having an open top portion 23 through which the hot water enters the brewing chamber 24 within the cartridge from the hot water outlet 12. At its lower end, the frusto-conical portion 22 is provided with a depending cylindrical wall 25 provided with a transverse bottom wall 26 having an opening 28 defining the outlet from the cartridge. A suitable handle 27 may be provided for manipulating the cartridge as in servicing the same. Further, the cartridge may be provided with a plurality of legs 38 for resting on a suitable surface S subjacent the hot water outlet 12.

A suitable frame 29 may be installed in the cartridge for carrying a filter 30 arranged to hold a charge 31 of beverage brewing material such as ground coffee. As shown in FIGURE 1, the frame 29 is frusto-conical fitting within the frusto-conical portion 22 of the cartridge, and the filter 30 is conical extending downwardly into the space 32 defined by the depending wall 25 and bottom wall 26 of the cartridge.

As best seen in FIGURE 2, liquid is delivered from the outlet 28 through a delivering means generally designated 33 which includes a connector 34 connected to the bottom wall 26 at outlet 28, a first upright conduit portion 35 extending from connector 34, and a second downwardly extending conduit portion 36 connected to conduit portion 35 at their upper ends by a U-shaped conduit portion 37. Thus, the delivering means 33 effectively defines a gooseneck siphon extending from outlet 28 to an uppermost portion defined by the U-shaped conduit 37 substantially above the bottom of the upper level of the charge 31. In the illustrative embodiment, the gooseneck portion 37 is substantially midway between the top and bottom of the frusto-conical portion 22 of the cartridge.

The operation of the apparatus 10 is extremely simple. The user firstly places in the cartridge 22 the frame 29 and filter cone 30 with a suitable quantity of ground coffee 31 disposed in the lower portion of the cone. The cartridge is then disposed suitably to receive a preselected quantity of hot water to make a decanter of coffee. The decanter 15 is placed under the outlet 14 defined by the lower end of the conduit portion 36 to receive the coffee from the brewing cartridge during the brewing operation.

The user then causes the preselected quantity of hot water to be dispensed from the hot water supply, herein supply 11. In the illustrative embodiment, this is effected by a suitable operation of valve 21. The initial portion of the hot water delivered to the brewing cartridge 13 is effectively retained in the cartridge until the level rises to the level of the gooseneck portion 37 of the delivering means 33. While a small amount of the water at this time passes through the filter 30 into the space 32 and conduit portion 35, the volume thereof is made to be quite small so as to be effectively insignificant with respect to the total quantity of coffee being brewed during the operation. Thus, effectively, substantially all of the initially delivered hot water remains in the brewing cartridge 13 to submerge the coffee grounds 31 and effect an initial submersion type brewing of the coffee. Thus, the coffee grounds are not only wetted, but permitted to undergo an actual brewing operation wherein they are totally submerged in the brewing liquid. After a period of time, the level of liquid in the cartridge rises to the level of the gooseneck 37 whereupon the brewed beverage may now flow from the outlet 28 through the conduit portion 35, the gooseneck portion 37, and downwardly through the conduit portion 36 through the outlet 14 which comprises the lowermost portion of delivering means 33 into the decanter 15. During the subsequent portion of the brewing operation the hot water being delivered to the cartridge from the hot water supply 11 effects a drip type brewing of the beverage in the conventional manner wherein the hot water flows downwardly through the coffee grounds and through the filter to be conducted by the delivering means into the decanter. A highly improved infusion results from the improved extraction of the coffee essences from the brewing ingredient provided by the successive submersion type brewing and drip type brewing operations.

As shown in FIGURE 2, the level of the water in the cartridge rises up to slightly subjacent the top of the filter cone 30 during the brewing operation. To this end, the delivery means 33 is arranged to conduct the brew from the cartridge 13 at a slightly slower rate than that at which the water is delivered to the cartridge from the hot water outlet 12. Upon completion of the delivery of water from the hot water supply 11, the level of liquid in the cartridge descends until substantially all of the beverage produced in the brewing operation is withdrawn through the outlet 28 and upwardly through the conduit portion 35 to the gooseneck portion 37. During the last portion of this delivery, the delivery means 33 functions as a siphon in that the last portion of the brewed beverage is sucked upwardly to the gooseneck portion 37 and downwardly through conduit portion 36 through outlet 14 until the suction is broken at the end of the delivery. Thus, the brewed beverage is substantially completely extracted from the brewing cartridge automatically by the siphoning action of the delivering means 33.

It has been found that a small amount of residual water is retained by the coffee grounds during a brewing operation. This small quantity, if allowed to drip outwardly through the outlet of the brewing apparatus, produces a highly undesirable post-brewing drip. To effectively eliminate this undesirable functioning, the capacity of space 32 is made to be sufficient to accommodate, with the lower portion of the conduit 35, all of the residual liquid. Thus, when the flow of brewed beverage from the outlet 14 is terminated by the breaking of the suction, all further delivery of liquid from the cartridge is effectively precluded, thereby completely eliminating the highly undesirable post-brewing drip of the conventional devices. The collection of the residual liquid is illustrated in FIGURE 4 to be substantially below the level of the gooseneck portion 37, thereby effectively positively precluding drip of the collected liquid from the outlet 14.

Upon completion of the brewing operation, the user need merely remove the frame 29 to discard the spent charge 31 and filter 30 for disposal as desired. The collected liquid in the space 32 may be dispensed therefrom by simply inverting the cartridge over a suitable drain. Thus, when a subsequent quantity of beverage is to be brewed with the cartridge 13, the user then merely need replace the frame 29 with a new filter cone 30 and fresh charge 31 for brewing in the above discussed manner.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a brewing apparatus having means for providing a preselected quantity of hot water, structure comprising:
    means defining a brewing chamber having an upper inlet for receiving a hot water from said providing means, and a lower outlet for delivering brewed beverage from the chamber;
    means for carrying a brewing charge in the chamber to be acted upon by the hot water therein to produce a beverage; and means for delivering brewed beverage from said chamber through said outlet including means for retaining the hot water in the brewing chamber until the level thereof rises to a preselected level intermediate said upper inlet and said lower outlet whereby at least a portion of the charge is submerged and then causes delivery of substantially all of the brewed beverage from said chamber through said outlet as a result of the water rising to said preselected level, thereby permitting the initial portion of the hot water provided to the chamber to effect a submersion type brewing of the beverage and the subsequent portion of said preselected quantity of hot water to effect a drip type brewing of the beverage.

2. The brewing apparatus of claim 1 wherein said brewing chamber means further defines means for holding a preselected quantity of liquid below said charge.

3. The brewing apparatus of claim 1 wherein said delivering means includes means for causing substantially all of the brewed beverage to be delivered from the chamber and delivery means.

4. The brewing apparatus of claim 1 wherein said delivery means includes a gooseneck siphon connected to said outlet and extending upwardly to said preselected level.

5. The brewing apparatus of claim 1 wherein said brewing chamber includes means for collecting drip from said charge subsequent to a brewing operation and precluding undesired delivery of the collected drip from said delivery means.

6. The brewing apparatus of claim 1 wherein said delivering means is constructed to cause said preselected level to be substantially above the top of the brewing charge placed in the chamber.

7. The brewing apparatus of claim 1 wherein said brewing chamber further defines means for holding a preselected quantity of liquid partially below said charge and partially laterally thereof.

8. The brewing apparatus of claim 1 wherein said brewing chamber means further defines means for holding a preselected quantity of liquid below said charge, said outlet being provided in a bottom portion of said holding means.

9. The brewing apparatus of claim 1 wherein said brewing chamber includes a bottom-most wall portion and said outlet comprises an opening in said wall portion.

10. The brewing apparatus of claim 1 wherein said brewing chamber means further defines means for holding a preselected quantity of liquid below said charge, said preselected quantity of liquid being no greater than the maximum quantity of drip from said charge subsequent to a completion of a brewing operation.

References Cited

UNITED STATES PATENTS

| | | | |
|---|---|---|---|
| Re. 25,663 | 10/1964 | Bunn | 99—83 X |
| 325,223 | 8/1885 | Boyes | 222—416 X |
| 451,862 | 5/1891 | Moncrieff et al. | 222—204 |
| 1,513,685 | 10/1924 | Ardovino. | |
| 3,092,012 | 6/1963 | Ruhnke | 222—416 X |

WILLIAM I. PRICE, *Primary Examiner.*

S. P. FISHER, *Assistant Examiner.*